United States Patent
Sun et al.

(10) Patent No.: US 9,310,948 B2
(45) Date of Patent: Apr. 12, 2016

(54) ARRAY SUBSTRATE, TOUCH SCREEN PANEL AND DISPLAY DEVICE

(71) Applicants: ORDOS YUANSHENG OPTOELECTRONICS CO., LTD., Ordos, Inner Mongolia (CN); BOE TECHNOLOGY GROUP CO., LTD., Beijing (CN)

(72) Inventors: Jian Sun, Beijing (CN); Fuqiang Li, Beijing (CN); Cheng Li, Beijing (CN)

(73) Assignees: ORDOS YUANSHENG OPTOELECTRONICS CO., LTD., Ordos, Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 31 days.

(21) Appl. No.: 14/345,050

(22) PCT Filed: Nov. 11, 2013

(86) PCT No.: PCT/CN2013/086892
§ 371 (c)(1),
(2) Date: Mar. 14, 2014

(87) PCT Pub. No.: WO2014/190672
PCT Pub. Date: Dec. 4, 2014

(65) Prior Publication Data
US 2015/0145812 A1    May 28, 2015

(30) Foreign Application Priority Data

May 31, 2013   (CN) .......................... 2013 1 0215478

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 2203/04112* (2013.01)

(58) Field of Classification Search
CPC .................. G06F 3/044; G06F 3/0412; G06F 2203/04112
USPC ........................................................ 345/173
See application file for complete search history.

(56) References Cited

U.S. PATENT DOCUMENTS 7,573,459 B2    8/2009 Shih et al.
8,111,344 B2 *  2/2012 Moon et al. ..................... 349/48
(Continued)

FOREIGN PATENT DOCUMENTS

CN    102866815 A    1/2013
CN    103105989 A    5/2013
(Continued)

OTHER PUBLICATIONS

International Search Report mailed Jun. 3, 2014; PCT/CN2013/086892.
(Continued)

*Primary Examiner* — Dmitriy Bolotin
(74) *Attorney, Agent, or Firm* — Ladas & Parry LLP

(57) ABSTRACT

An array substrate, a touch screen panel and a display device are provided. The array substrate includes a plurality of gate lines, a plurality of data lines, a plurality of touch sensing units, and each touch sensing unit comprises a touch scanning line, a touch sensing line, a first transistor and a sensing electrode, the touch scanning line is connected with a gate electrode and a drain electrode of the first transistor and the sensing electrode is connected with a source electrode of the first transistor; the touch sensing line and the sensing electrode are provided in different layers, spaced apart by an insulating layer and have an overlapping region. This array substrate decreases areas of non-display regions on the array substrate, increases aperture ratio of the touch screen panel and in turn enhances brightness of the display device.

20 Claims, 7 Drawing Sheets

(56) References Cited

U.S. PATENT DOCUMENTS

| | | | |
|---|---|---|---|
| 2005/0116937 A1* | 6/2005 | Choi et al. | 345/173 |
| 2008/0158199 A1* | 7/2008 | Lee et al. | 345/174 |
| 2009/0183931 A1* | 7/2009 | Okano et al. | 178/18.03 |
| 2010/0079406 A1* | 4/2010 | Chen et al. | 345/174 |
| 2011/0096023 A1* | 4/2011 | Shih et al. | 345/174 |
| 2011/0310057 A1* | 12/2011 | Wang | 345/174 |
| 2014/0062944 A1 | 3/2014 | Wang et al. | |
| 2014/0104228 A1* | 4/2014 | Chen et al. | 345/174 |
| 2014/0111471 A1* | 4/2014 | Zhao | 345/174 |

FOREIGN PATENT DOCUMENTS

| | | | |
|---|---|---|---|
| CN | 103294317 A | | 9/2013 |
| CN | 203299793 U | * | 11/2013 |
| JP | 2006-276583 A | | 10/2006 |

OTHER PUBLICATIONS

First Chinese Office Action Appln. No. 201310215478.1; Dated Jul. 3, 2015.

International Preliminary Report on Patentability Appln. No. PCT/CN2013/086892; Dated Dec. 1, 2015.

* cited by examiner

ARRAY SUBSTRATE, TOUCH SCREEN PANEL AND DISPLAY DEVICE

TECHNICAL FIELD

Embodiments of the present invention relate to an array substrate, a touch screen panel and a display device.

BACKGROUND

With the fast development of display technology, touch screen panels have gradually become popular in life. At present, touch screen panels may be classified into resistive type, capacitive type, infrared ray type and surface acoustic wave type depending on their operating principles. Capacitive touch screen panels are widely applied in industry since they can realize true multi-point control and high sensitivity.

Capacitive touch screen panels may be classified into add-on touch screen panels, on-cell touch screen panels and in-cell touch screen panels according to their configuration structures. For add-on touch screen panels, the touch screen panel and display screen need to be produced separately and then attached together to form a liquid crystal display with touch function. Add-on touch screen panels suffer disadvantages of high manufacturing costs, low light transmittance ratio and great module thickness. For an in-cell touch screen panel, the touch electrodes of touch screen panel are embedded in the liquid crystal display so as to reduce the entire thickness of a module and greatly reduce manufacturing costs of the touch screen panel. Therefore, in-cell touch screen panels have become attractive for panel manufacturers.

At present, conventional capacitive in-cell touch screen panels use two parallel electrodes to form a capacitor. When an operator touches the touch screen panel, capacitance at an intersection of two electrodes varies, and therefore it is possible to determine the location where the operator touches the screen from the variance in the capacitance.

FIG. 1A is a top view of a pixel unit in a conventional capacitive in-cell touch screen panel, FIG. 1B is an enlarged schematic diagram of a pixel unit on right side of FIG. 1A, and FIG. 2 is a sectional view along line A-A' in FIG. 1B.

The array substrate 10 of the conventional touch screen panel includes a plurality of gate lines 50, a plurality of data lines 60, a plurality of second thin film transistors 20, a plurality of first transistors 40, touch sensing lines 30, touch scanning lines 80 and sensing electrodes 31 formed on a base substrate 11. Extending parts 301 electrically connected with the touch sensing lines 30 are on a same layer as the sensing electrodes 31, and the extending parts 301 of the touch sensing lines 30 are disposed opposite the side surface of the sensing electrodes 31 to form coupling capacitors. The sensing electrode 31 is connected with a source electrode 43 of the first transistor 40, and the touch scanning line 80 is connected with a gate electrode 41 and a drain electrode 44 of the first transistor 40. When an operator touches the touch screen panel, the touch influences capacitance between the touch sensing line 30 and the sensing electrode 31 to make the coupling capacitance at the touch location different from that at other locations. The touch screen panel determines the location where the operator touches the touch screen panel according to the received location of coupling capacitor in which capacitance varies.

Defects with the above-mentioned conventional touch screen panels lie in that, as illustrated in FIG. 1B, the coupling capacitors formed by extending parts of touch sensing lines and sensing electrodes parallel to each other in the same plane occupy large areas of the detection units, and since the coupling capacitors are located in non-display areas of the display screen, thereby reducing aperture ratio of the touch screen panel and influencing brightness of the display device.

SUMMARY

Embodiments of the present invention provide an array substrate, a touch screen panel and a display device for increasing aperture ratio of a touch screen panel and in turn enhancing brightness of the display device.

One aspect of the present invention provides an array substrate comprising a plurality of gate lines, a plurality of data lines and a plurality of touch sensing units; each of the touch sensing units comprising a touch scanning line and a touch sensing line intersecting each other, a first transistor and a sensing electrode, the touch scanning line being connected with a gate electrode and a drain electrode of the first transistor and the sensing electrode being connected with a source electrode of the first transistor; the touch sensing line and the sensing electrode are provided in different layers, spaced apart by an insulating layer and have an overlapping region.

Another aspect of the present invention further provides a touch screen panel comprising the above-mentioned array substrate.

Yet another aspect of the present invention further provides a display device comprising the above-mentioned touch screen panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

| | | |
|---|---|---|
| 10-Array substrate | 20-Second transistor | 30-Touch sensing line |
| 31-Sensing electrode | 40-First transistor | 41-Gate electrode |
| 42-Active layer | 43-Source electrode | 44-Drain electrode |
| 45-Transparent electrode | 46-Passivation layer | 47-Gate insulating layer |
| 50-Gate line | 60-Data line | 70-Pixel electrode |
| 80-Touch scanning line | | |

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," or the like which are used in the disclosure are not intended to indicate any sequence, amount or importance, but distinguish different components. Also, the terms such as "a," "an," "the" or the like are not intended to limit the amount, but indicate the existence of at lease one. The terms "comprises," "comprising," "includes," "including," and "contains", "containing" and the like are intended to specify that the elements or the objects stated before these terms encompass the elements or the objects and equivalents thereof listed after these terms, but do not preclude the other elements or objects. The phrases "connect", "connected" and the like are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to increase the aperture ratio of a touch screen panel and thus enhance brightness of a display device, embodiments of the present invention provide an array substrate, a touch screen panel and a display device which can reduce areas of non-display regions of the array substrate, increase the aperture ratio of the touch screen panel and in turn enhance brightness of the display devices by adopting vertically disposed coupling capacitors.

Figure 1A:
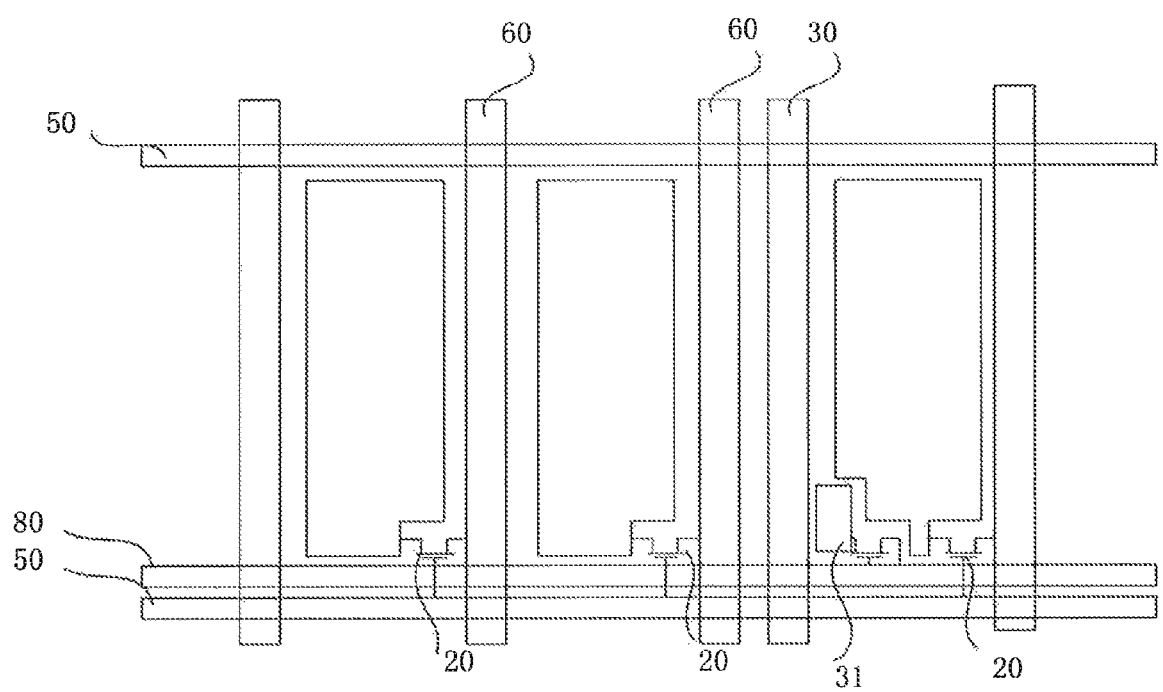
FIG. 1A is a top view of a pixel unit in a conventional capacitive in-cell touch screen panel.
Figure 1B:
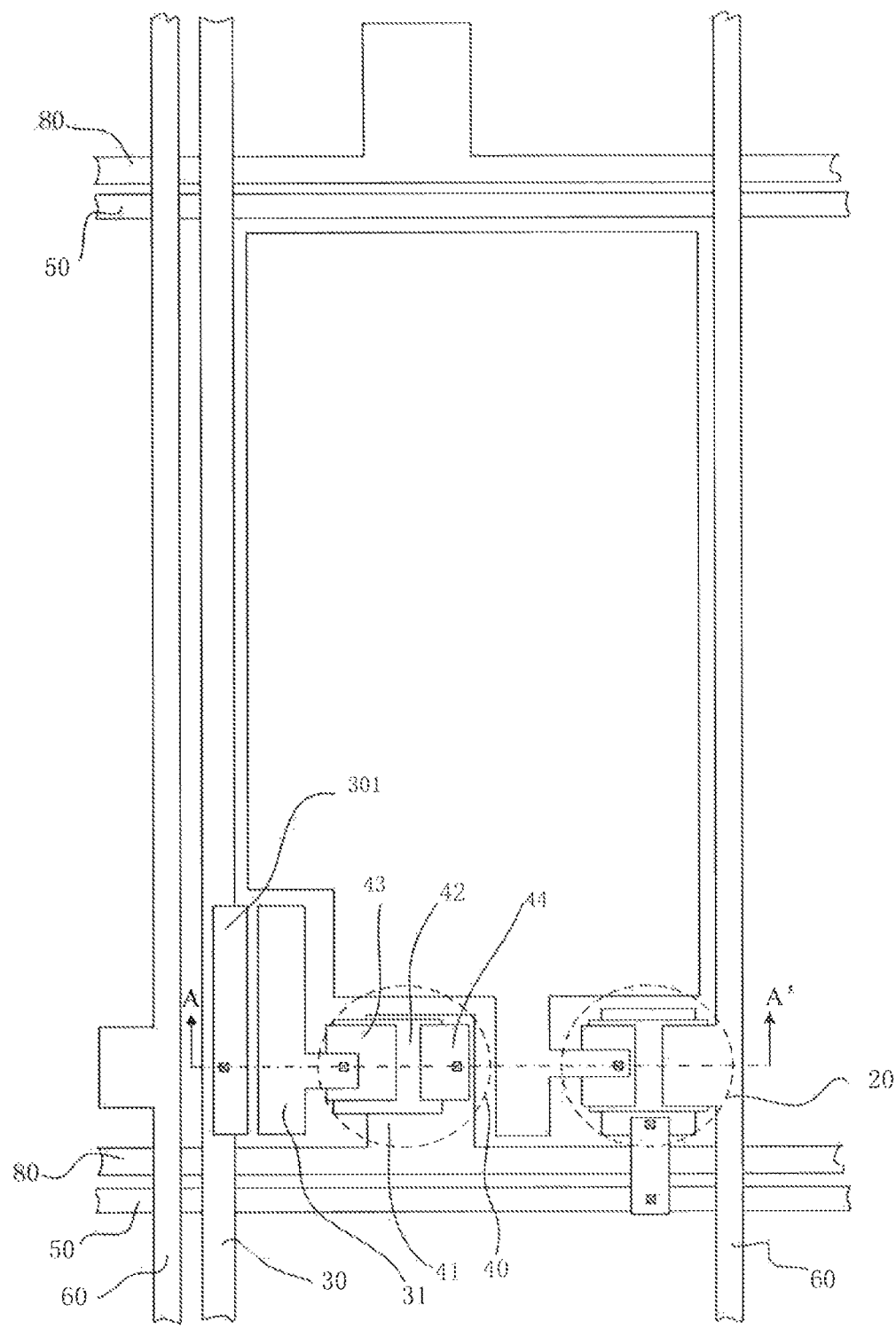
FIG. 1B is an enlarged schematic diagram of a touch unit on right side of FIG. 1A.
Figure 2:
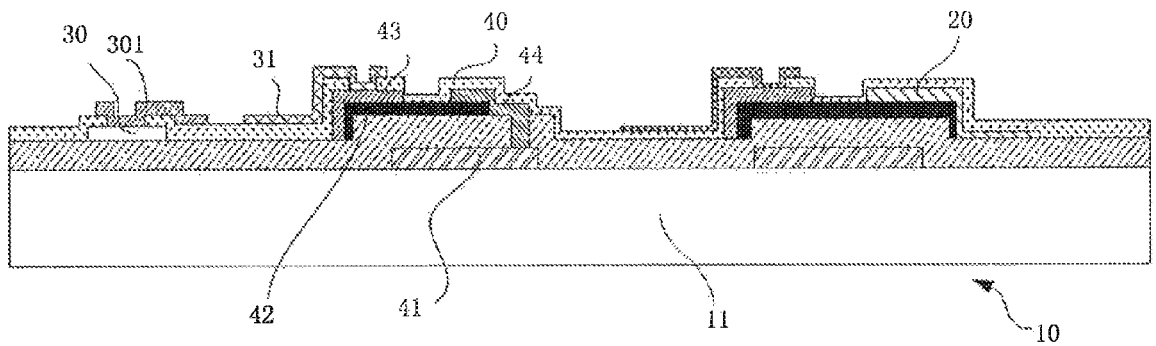
FIG. 2 is a sectional view along line A-A' in FIG. 1B.
Figure 3A:
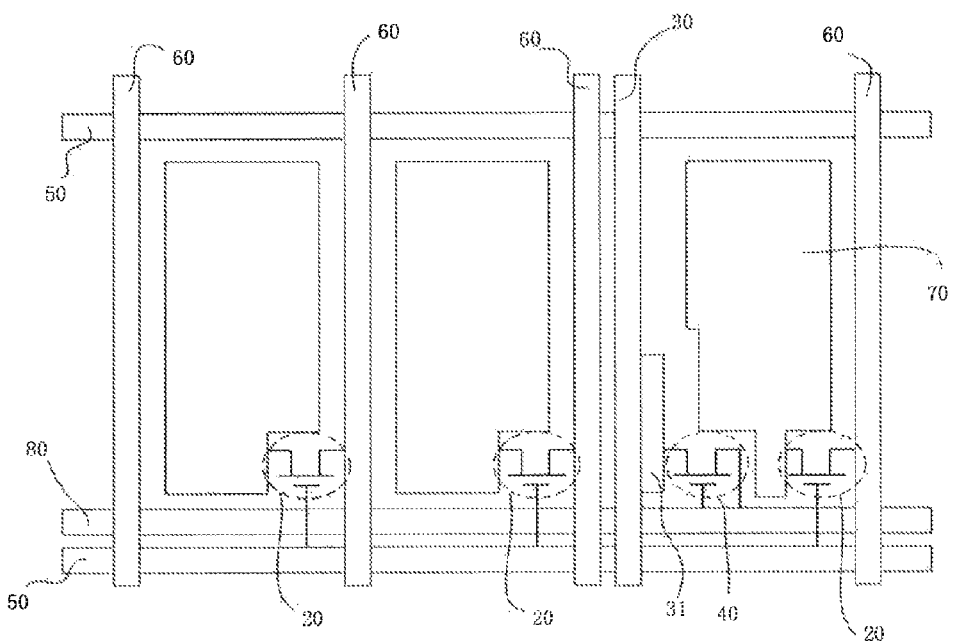
FIG. 3A is a top view of a pixel unit in a touch screen panel provided in one embodiment of the present invention.
Figure 3B:
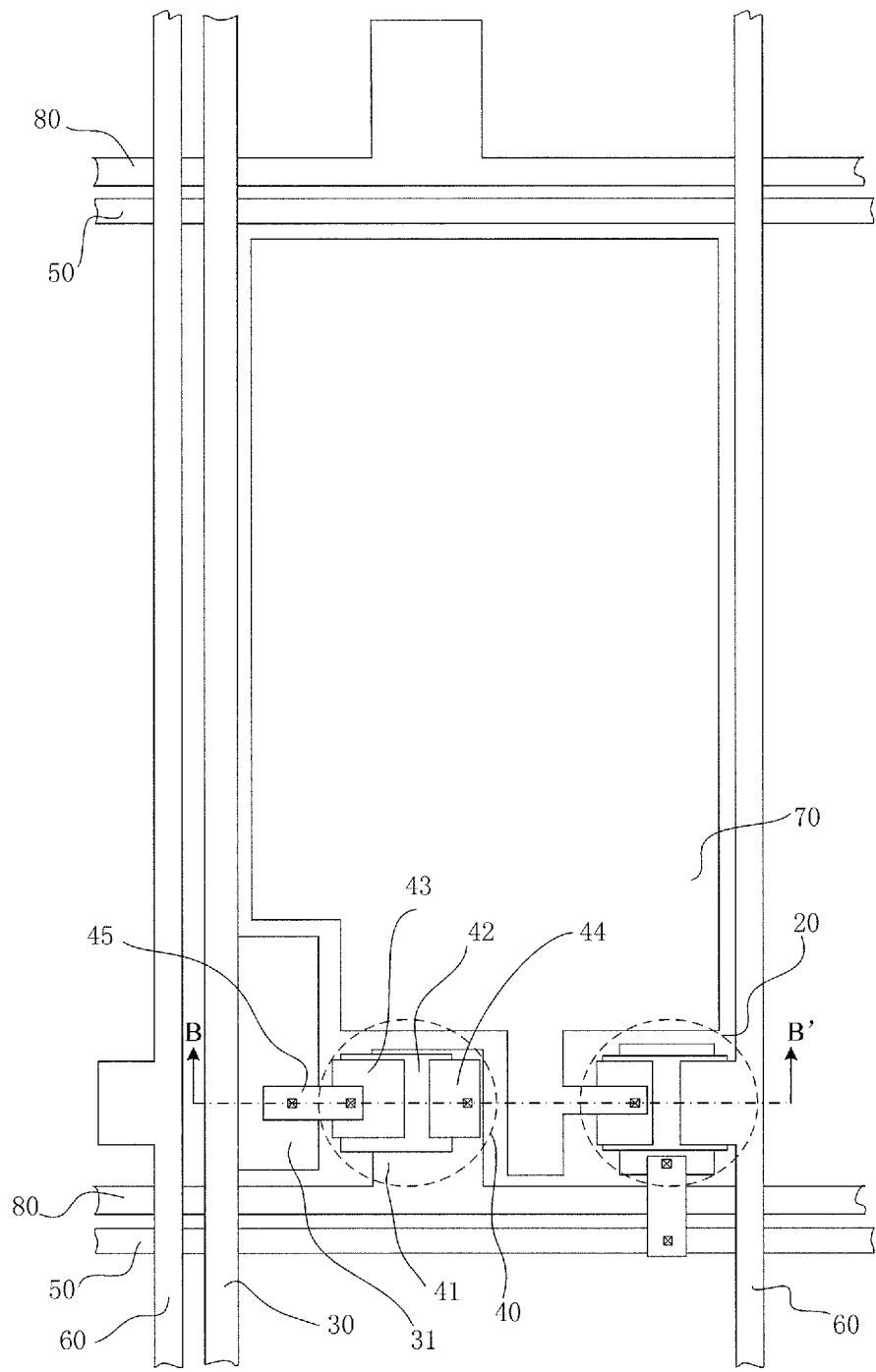
FIG. 3B is an enlarged schematic diagram of a pixel unit on right side of FIG. 3A.
Figure 4:
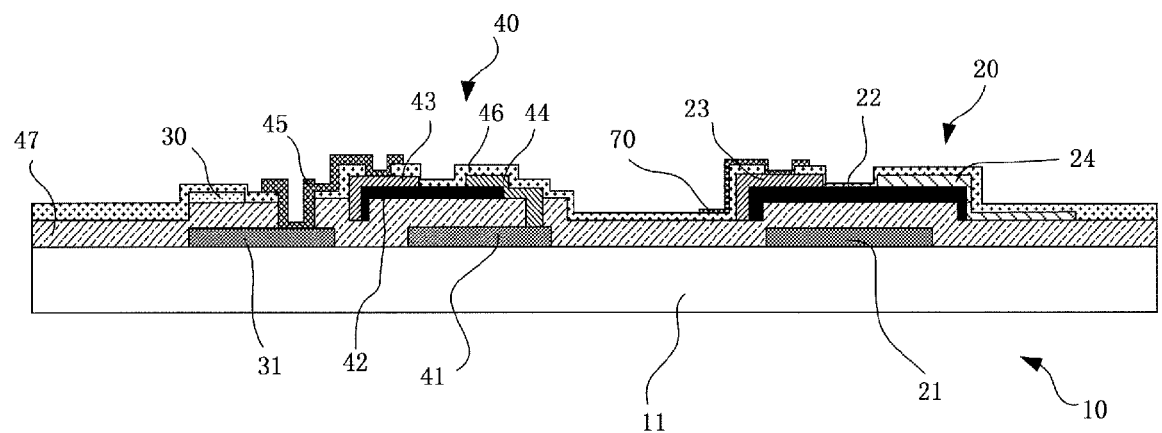
FIG. 4 is a sectional view along line B-B' in FIG. 3B.

FIG. 3A is a top view of a pixel unit in a touch screen panel provided in one embodiment of the present invention, FIG. 3B is an enlarged schematic diagram of a pixel unit on right side of FIG. 3A; and FIG. 4 is a sectional view along line B-B' in FIG. 3B.

An array substrate 10 provided in an embodiment of the present invention comprises a plurality of gate lines 50 and a plurality of data lines 60 formed on a base substrate 11 which intersect each other to define a plurality of pixel units of the display device. The array substrate 10 further comprises a plurality of touch sensing units each comprising a touch scanning line 80 and a touch sensing line 30 intersecting each other, a first transistor 40 and a sensing electrode 31. In other words, each touch sensing unit is defined by a touch scanning line 80 and a touch sensing line 30 intersecting each other. Gate lines 50 and touch scanning lines 80 are disposed parallel to each other. Although the gate line 50 is illustrated in FIG. 3A to be below the touch scanning line 80, the embodiment of the present invention is not limited thereto. Also, data lines 60 and touch sensing lines 30 are disposed parallel to each other. Although the data line 60 is illustrated in FIG. 3A to be on the left of the touch sensing line 30, the embodiment of the present invention is not limited thereto.

Furthermore, it not necessary for the touch sensing units to be in one-to-one correspondence relationship with the pixel units, and it is workable that one touch sensing unit corresponds to a plurality of pixel units. For example, one touch sensing unit may correspond to three or more pixel units. A touch scanning line 80 is electrically connected with a gate electrode 41 and a drain electrode 44 of a first transistor 40, and a sensing electrode 31 is electrically connected with a source electrode 43 of the first transistor 40. The first transistor 40 comprises a gate electrode 41, an active layer 42, a source electrode 43 and a drain electrode 44, and the gate electrode 41 and the active layer 42 are spaced apart by a gate insulating layer interposed therebetween, as illustrated in FIGS. 3A and 4.

Touch sensing lines 30 and sensing electrodes 31 are separately disposed via an insulating layer (insulated and layered arrangement) and have overlapping regions with each other, that is, they overlap each other in the direction perpendicular to the base substrate 11. In this embodiment, the touch sensing lines 30 and the sensing electrodes 31 are spaced apart by a gate insulating layer 47.

The operation principle of the array substrate provided in the embodiment of the present invention is as follows.

A touch sensing line 30 and a sensing electrode 31 that are in different layers, spaced apart by an insulating layer and have overlapping regions with each other form a coupling capacitor in the vertical direction. When a touch screen panel comprising the array substrate of this embodiment is in operation, the touch scanning line 80 is connected with the gate electrode 41 and the drain electrode 44 of the first transistor 40; after a high level signal is provided to the touch scanning line 80, the channel between the source electrode 43 and the drain electrode 44 in the first transistor 40 become conductive to electrify the sensing electrode 31, which thus makes the coupling capacitor formed by the touch sensing line 30 and the sensing electrode 31 has a certain capacitance value. When a finger of an operator or a touchpen touches the panel, a capacitor is framed between the finger or touchpen and the sensing electrode 31, which causes the coupling capacitance between the touch sensing line 31 and the sensing electrode 31 to vary. In this way, variation of the total coupling capacitance can be detected and then the location of touch can be further determined by the touch sensing line 30. Since the vertical overlapping region between the touch sensing line 30 and the sensing electrode 31 forms a vertical coupling capacitor and since the capacitance of a vertically disposed coupling capacitor per unit area is larger than that of a parallel disposed coupling capacitor, the array substrate provided in the embodiment of the present invention, in the case of achieving same sensitivity, reduces the areas of non-display regions of the array substrate, increases aperture ratio of a touch screen panel in comparison with a conventional array substrate and enhances brightness of the display device.

In the above-mentioned embodiment, touch sensing lines 30 and sensing electrodes 31 with vertical overlapping regions therebetween can bring about large capacitance, and when a finger of an operator or a touchpen touches the touch panel of a display device, capacitance variation of coupling capacitors 30 is large, and therefore the touch panel is more sensitively detectable. Furthermore, in order to increase capacitance of the formed coupling capacitors, the sensing electrodes 31 may further have extending parts in the direction in which the touch sensing lines 30 are disposed (i.e., length direction of the touch sensing lines 30) so as to increase the areas of overlapping regions between the touch sensing lines 30 and the sensing electrodes 31, thereby increasing capacitance of the formed coupling capacitors.

In the above-mentioned embodiment, the array substrate further comprises a plurality of pixel units each comprising a second transistor 20 and a pixel electrode 70, that is, the second transistor 20 controls charging and discharging of the pixel electrode 70. As illustrated in FIG. 4, the second transistor 20 comprises a gate electrode 21, an active layer 22, a source electrode 23 and a drain electrode 24. The gate electrode 21 is electrically connected with a corresponding gate line 50, and the drain electrode 24 is electrically connected with a corresponding data line 60. The pixel electrode 70 is electrically connected with the source electrode 23 of the second transistor 20 through a via in the passivation layer 46. The electrical connection configuration of the second transistor 20 and the pixel electrode 70 is not limited to the example shown.

In order to form coupling capacitors between the touch sensing lines 30 and the sensing electrodes 31 in the vertical direction, the touch sensing lines 30 and the sensing electrodes 31 are in different layers of the array substrate. As illustrated in FIG. 3A, the touch sensing lines 30 may be disposed parallel to the data lines 60 in a same layer such that the touch sensing lines 30 may be formed in the same masking process (patterning process) as the data lines 60 so as to save processing costs. Or, the touch sensing line 30 may be at least one of the data lines 60. For example, functions of touch sensing lines and data lines are implemented by a time division multiplexing mode, which arrangement can further increase aperture ratio of the touch screen panel.

The sensing electrodes 31 may be disposed at different locations. For example, the sensing electrodes 31 may be disposed insulated with the pixel electrodes 70 on a same layer, or the sensing electrodes 31 may be disposed insulated with the gate lines 50 on a same layer. Thus, the sensing electrodes 31 may be formed along with the pixel electrodes 70 or the gate lines 50 in a same patterning process, thus simplifying the manufacturing.

For example, in the illustrative structure as illustrated in FIG. 4, the sensing electrode 31 is disposed on a same layer with the gate electrode 41 of the first transistor 40 (the gate electrode 41 and the gate line 50 are disposed on a same layer), and both may be formed with a same material in a same patterning process. The gate insulating layer 47 is formed on the sensing electrode 31, the touch sensing line 30 is formed on the gate insulating layer 47, a passivation layer 46 covers the touch sensing line 30 and the gate insulating layer 47, a via is provided in the gate insulating layer 47 and the passivation layer 46 to expose the sensing electrode 31 and the drain electrode 43 of the first transistor 40, and the drain electrode 43 of the first transistor 40 is connected with the sensing electrode 31 through the transparent electrode layer 45, as illustrated specifically in FIG. 4. For example, the transparent electrode layer 45 may be formed in a same patterning process with the pixel electrode 70.

The magnitude of coupling capacitance between the sensing electrode 31 and the touch sensing line 30 is mainly influenced by factors such as the overlapping area between the sensing electrode 31 and the touch sensing line 30, the distance between the sensing electrode 31 and the touch sensing line 30, and the dielectric constant of the dielectric material between them. Therefore, on one hand, it is possible to increase the overlapping area by making the sensing electrode 31 to extend in the direction in which the touch sensing line 30 is arranged, or making the touch sensing line 30 to extend towards the direction of the touch electrode 31 or having both to extend to each other, so as to increase the coupling capacitance and in turn enhance touch sensitivity. On the other hand, it is possible to reduce the distance between the sensing electrode 31 and the touch sensing line 30, namely to reduce the thickness of the gate insulating layer 47 to increase the coupling capacitance and enhance touch sensitivity. In addition, the gate insulating layer 47 made of a different material may also be used to increase the coupling capacitance and enhance touch sensitivity.

It is to be noted that the specific shape of the sensing electrode 31 in this embodiment is not limited in any way so long as it has an overlapping area with the touch sensing line 30. For example, the sensing electrode may be an electrode of a strip shape, a square shape, a T-shape or an L-shape. In the exemplary structure illustrated in FIG. 3B, the sensing electrode 31 is an electrode of a square shape.

Figure 3C:
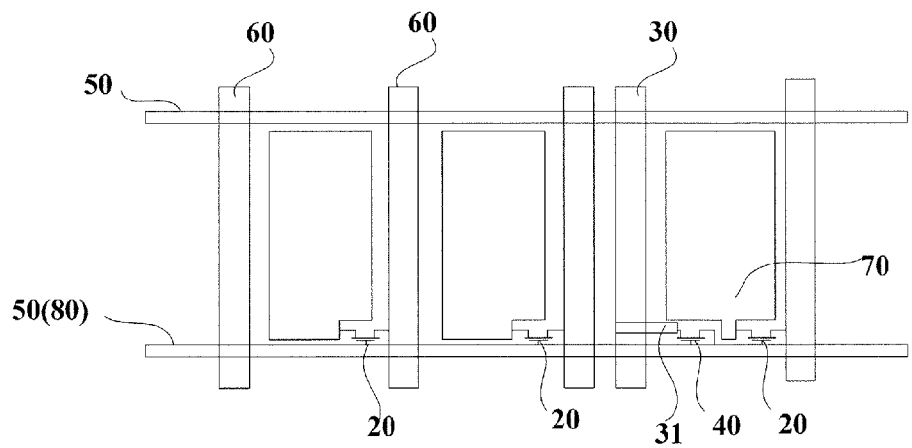
FIG. 3C is a schematic diagram of one variant of the embodiment.

In the above-mentioned embodiment, the touch scanning lines 80 may also be disposed in a different way. For example, it is possible to form touch scanning lines 80 separately on the array substrate 10, and it is also possible that at least one of the gate lines 50 is used as the touch scanning line 80. For example, the functions of touch scanning lines and gate lines can be implemented in a time division multiplexing way. The modified example is illustrated in FIG. 3C. That is, in order to further increase the aperture ratio of the touch screen panel, touch scanning lines 80 and gate lines 50 are used in multiplex, which allows the touch screen panel to have high aperture ratio.

Figure 5:
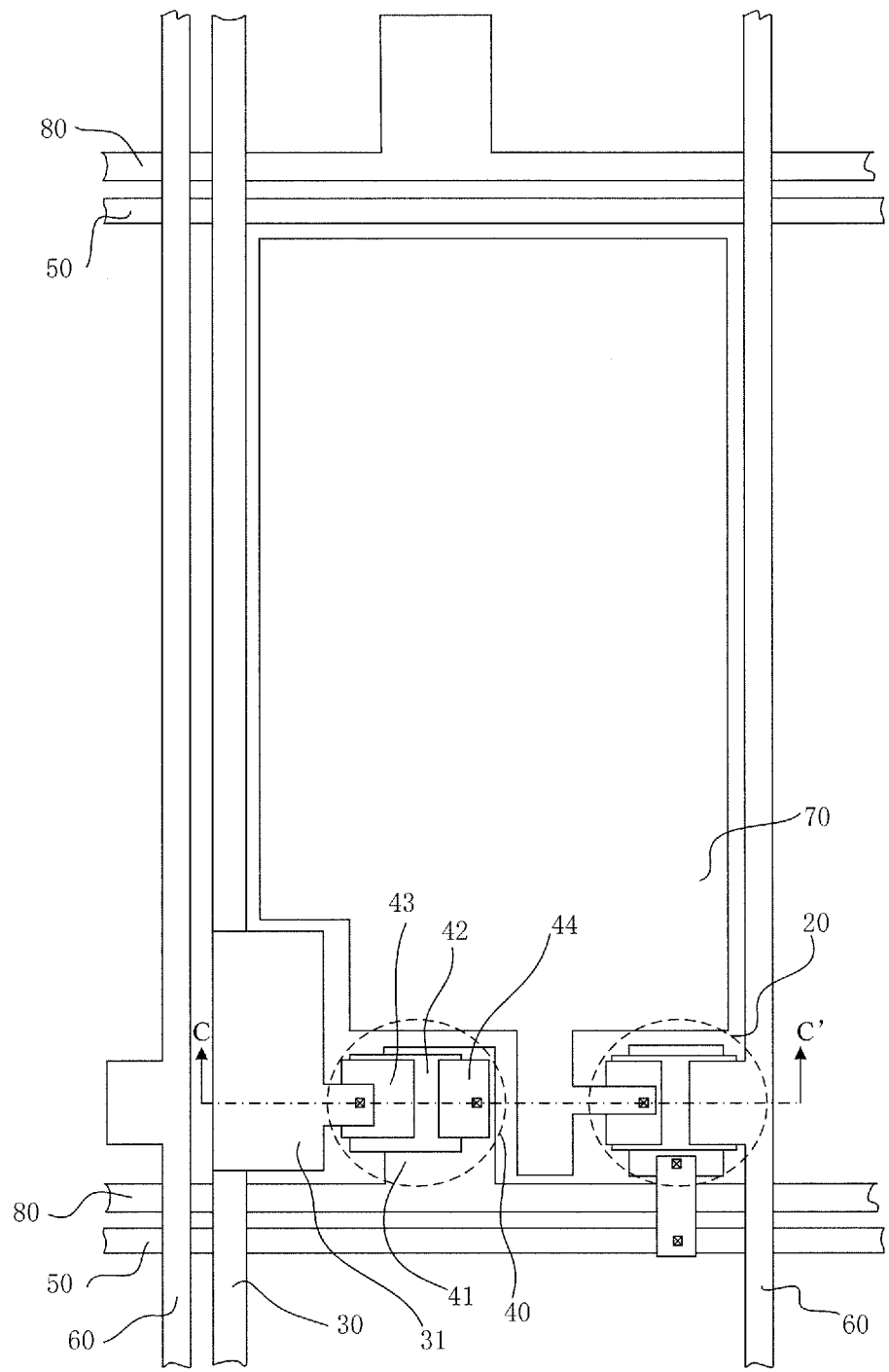
FIG. 5 is a top view of a pixel unit in a touch screen panel provided in another embodiment of the present invention.
Figure 6:
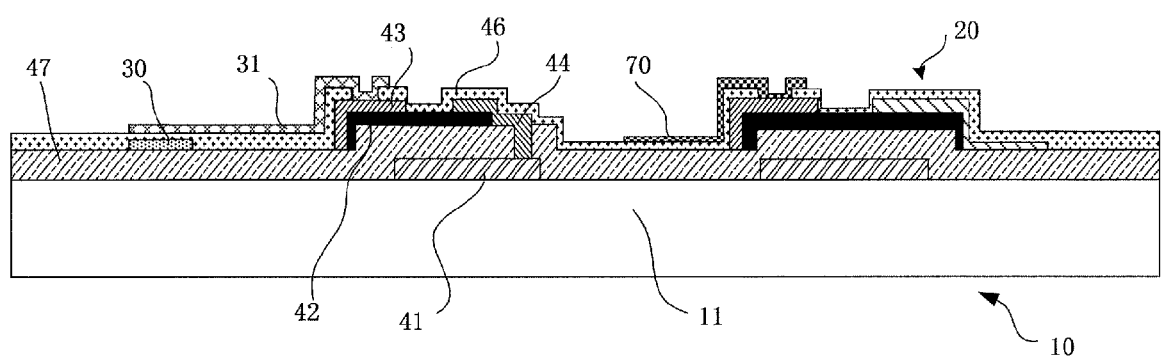
FIG. 6 is a sectional view along line C-C' in FIG. 5.

FIG. 5 is a top view of a pixel unit in a touch screen panel provided in another embodiment of the present invention; and FIG. 6 is a sectional view along line C-C in FIG. 5.

Also, the array substrate 10 provided in this embodiment comprises a plurality of gate lines 50 and a plurality of data lines 60 formed on a base substrate 11 which intersect each other to define a plurality of pixel units of the display device each comprising a second transistor 20 and a pixel electrode 70. The array substrate 10 further comprises a plurality of touch sensing units each comprising a touch scanning line 80 and a touch sensing line 30 intersecting each other, a first transistor 40 and a sensing electrode 31. The touch scanning line 80 is electrically connected with a gate electrode 41 and a drain electrode 44 of the first transistor 40, and the sensing electrode 31 is electrically connected with a source electrode 43 of the first transistor 40. The first transistor 40 comprises a gate electrode 41, an active layer 42, a source electrode 43 and a drain electrode 44.

This embodiment differs from that illustrated in FIGS. 3B and 4 in that the sensing electrode 31 and the pixel electrode 70 are disposed on a same layer and above the touch sensing line 30, and spaced apart from the touch sensing line 30 through the passivation layer 46 and overlap each other in the vertical direction. The sensing electrode 31 is electrically connected with the source electrode of the first transistor 40 through a via in the passivation layer 46. In this way, for example, the sensing electrode 31 may be formed in a same patterning process with the pixel electrode 70.

In this embodiment, also functions of the touch sensing line and the data line are implemented in a time division multiplexing way, or functions of the touch scanning line and the gate line are implemented in a time division multiplexing way, which may further increase the aperture ratio of the touch screen panel.

In the above-mentioned embodiment, in order to improve touch precision of the touch screen panel, for example, the array substrate 10 comprises a plurality of pixel units at least two of which are provided with one touch sensing unit correspondingly. For example, every three adjacent pixel units are provided with one touch sensing unit correspondingly. Thus the touch sensing unit can detect different locations where a finger touches the touch screen panel. Since the touch precision of the touch screen panel is the order of millimeter, the manufacturers can choose the number of touch sensing units on their own according to requirements on touch precision, which is not limited to the above-mentioned configuration, i.e., every three adjacent pixel units correspond to one touch sensing unit.

In the above-mentioned embodiment, the array substrate 10 further comprises a gate insulating layer 47 disposed between the gate electrode 41 and the source electrode 43 of the first transistor 40 and the gate insulating layer 47 is between the touch sensing line 30 and the sensing electrode 31. Dielectric constant of the insulating material between electrode plates has a direct influence on capacitance of the capacitor. The gate insulating layer 47 disposed on the array substrate 10 increases the capacitance of coupling capacitors formed by overlapping regions of the touch sensing lines 30 and the sensing electrodes 31, so as to enhance the detection sensitivity of the touch screen panel.

In the above-mentioned embodiment, the array substrate 10 further comprises a passivation layer 46 disposed on the source electrode 43 (23), and the drain electrode 44 (24). The added passivation layer 46 is located at the outermost of the array substrate 10 such that the source electrodes 43, the drain electrodes 44 and the touch sensing lines 30 can be protected very well, hence preventing them from being scratched during the production and enhancing the quality of the produced array substrate 10.

A touch screen panel provided in an embodiment of the present invention comprises any of the above-mentioned array substrates and an opposed substrate. The array substrate and the opposed substrate are disposed opposite to each other to form a liquid crystal cell in which liquid crystal material is filled. The opposed substrate is for example a color filter substrate comprising color filter units corresponding to pixel units on the array substrate. The touch screen panel has better detection sensitivity and higher aperture ratio.

A display device provided in an embodiment of the present invention comprises any of the above-mentioned touch screen panel and has better display brightness. This display device may be a display, a mobile telephone, a TV set, a notebook computer or a unity machine. Remaining essential components for a display device are provided as understood by those skilled in the art, which are not described in detail here and should not limit the present invention.

What are described above is related to the illustrative embodiments of the disclosure only and not limitative to the scope of the disclosure; the scopes of the disclosure are defined by the accompanying claims.

The invention claimed is:

1. An array substrate comprising a plurality of gate lines, a plurality of data lines, a plurality of touch sensing units, wherein each of the touch sensing units comprising a touch scanning line and a touch sensing line intersecting each other, a first transistor and a sensing electrode, the touch scanning line is connected with a gate and a drain electrode of the first transistor, and the sensing electrode is connected with a source electrode of the first transistor;
the touch sensing line and the sensing electrode are spaced apart by an insulating layer and have an overlapping region.

2. The array substrate of claim 1, wherein the touch sensing lines and the data lines are on a same layer and disposed parallel to each other.

3. The array substrate of claim 2, further comprising a plurality of pixel units defined by the gate lines and the data lines intersecting each other, wherein each of the pixel units comprises a pixel electrode, and the sensing electrode and the pixel electrode are disposed in a same layer and insulated from each other.

4. The array substrate of claim 2, wherein the sensing electrodes and the gate lines are disposed in a same layer and insulated from each other.

5. The array substrate of claim 2, wherein at least one of the plurality of gate lines is the touch scanning line.

6. The array substrate of claim 1, further comprising a plurality of pixel units defined by the gate lines and the data lines intersecting each other, wherein each of the pixel units comprises a pixel electrode, and the sensing electrode and the pixel electrode are disposed in a same layer and insulated from each other.

7. The array substrate of claim 6, wherein at least two of the pixel units are provided with one of the touch sensing units correspondingly.

8. The array substrate of claim 7, wherein every adjacent three of the pixel units are provided with one of the touch sensing units correspondingly.

9. The array substrate of claim 1, wherein the sensing electrodes and the gate lines are disposed in a same layer and insulated from each other.

10. The array substrate of claim 1, wherein at least one of the plurality of gate lines is the touch scanning line.

11. The array substrate of claim 1, wherein the sensing electrode is an electrode of a strip shape, a square shape, a T-shape or an L-shape.

12. A touch screen panel comprising the array substrate according to claim 1.

13. A display device comprising the touch screen panel of claim 12.

14. The array substrate of claim 1, wherein the touch sensing line and the sensing electrode are provided in different layers.

15. The array substrate of claim 14, wherein the touch sensing lines and the data lines are on a same layer and disposed parallel to each other.

16. The array substrate of claim 14, further comprising a plurality of pixel units defined by the gate lines and the data lines intersecting each other, wherein each of the pixel units comprises a pixel electrode, and the sensing electrode and the pixel electrode are disposed in a same layer and insulated from each other.

17. The array substrate of claim 16, wherein at least two of the pixel units are provided with one of the touch sensing units correspondingly.

18. The array substrate of claim 17, wherein every adjacent three of the pixel units are provided with one of the touch sensing units correspondingly.

19. The array substrate of claim 14, wherein the sensing electrodes and the gate lines are disposed in a same layer and insulated from each other.

20. The array substrate of claim 14, wherein at least one of the plurality of gate lines is the touch scanning line.

* * * * *